A. SAMUELSON.
CONVEYER FOR HEATED GLASSWARE.
APPLICATION FILED JULY 12, 1920.
1,414,212.
Patented Apr. 25, 1922.
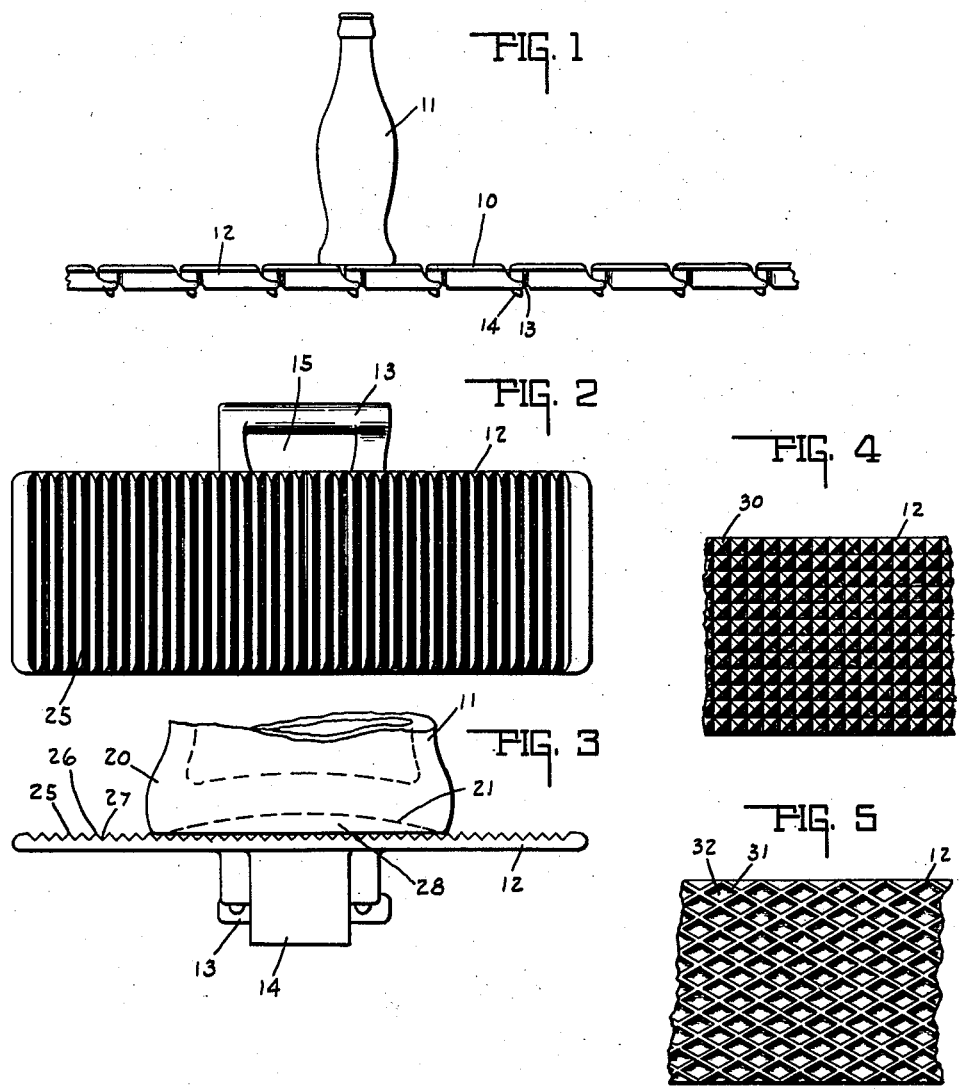
ALEXANDER SAMUELSON.
INVENTOR.
BY
ATTORNEYS.

UNITED STATES PATENT OFFICE.

ALEXANDER SAMUELSON, OF TERRE HAUTE, INDIANA, ASSIGNOR TO CHAPMAN J. ROOT, OF TERRE HAUTE, INDIANA.

CONVEYER FOR HEATED GLASSWARE.

1,414,212. Specification of Letters Patent. Patented Apr. 25, 1922.

Application filed July 12, 1920. Serial No. 395,713.

*To all whom it may concern:*

Be it known that I, ALEXANDER SAMUELSON, a citizen of the United States, and a resident of Terre Haute, county of Vigo, and State of Indiana, have invented a certain new and useful Conveyer for Heated Glassware; and I do hereby declare that the following is a full, clear, and exact description thereof, reference being had to the accompanying drawings, in which like numerals refer to like parts.

This invention relates to means for transporting heated glassware from the mold to other operative means, such as annealing ovens or lehrs.

The chief object of the invention is to provide a conveyer means which will transport glassware articles, such as bottles from the blow molds to the annealing ovens, and which will not disfigure the base or bottom of said glassware.

The chief feature of the invention consists in roughening the glassware supporting surface of the conveying means to reduce the surface in contact with the glassware, whereby the rapid transfer of heat from the glassware to the conveying means is reduced, which in turn reduces the cracking of the glassware base or disfigurement thereof, such as heretofore has prevailed.

The full nature of the invention will be understood from the accompanying drawings and the following description and claims.

In the drawings Fig. 1 is a side elevational view of the conveying means and an article of glassware. Fig. 2 is an enlarged plan view of one of the glassware supporting members. Fig. 3 is an end view of the same with a portion of an article of glassware positioned thereon to show the invention in detail. Fig. 4 is an enlarged plan view of a portion of a modification of the invention shown in Figs. 2 and 3. Fig. 5 is a similar view of another modification shown in said figures.

In the drawings 10 indicates the glassware conveying means and 11 indicates an article of glassware, such as a bottle or the like, which is formed in a mold in the usual manner. In the present instance the glassware conveying means comprises a plurality of metallic plate members, preferably interlocked to form an endless chain conveyer.

In Figs. 2 and 3 the conveyer forming member is shown enlarged and in detail. 12 indicates substantially a rectangular plate portion adapted to support the article of glassware, such as the bottle 11. Preferably integral therewith is formed a socket portion or loop 13 which extends outwardly from said plate portion 12 and beneath the same. Depending from said plate portion upon the opposite edge thereof from said socket forming means 13 is a catch member or tooth 14. As shown clearly in Fig. 3 the tooth member is narrower than the socket forming portion and is substantially the same width as the opening 15 in the socket forming portion 13. Thus, the plate members 12 may be assembled together to form an endless conveyer by the socket 13 of each plate receiving the tooth 14 of the adjacent plate. Preferably said plate, socket forming and tooth portions are formed integral and are metallic to withstand heat and wear.

The chief feature of the invention consists in forming the plate portion 12 in such a manner that the glassware supporting surface in contact with the glassware is substantially reduced to prevent the rapid transfer of heat from the heated glassware to the metallic conveyer members, which reduces or prevents the cracking of the base of said glassware. Heretofore the heated glassware when deposited upon the conveyer cooled most rapidly at the base portion 20, said portion being in contact with the conveyer. The base portion 20, as shown by the dotted lines 21 in Fig. 3, usually includes a considerable amount of glass. Therefore, said base contains a considerable amount of heat. When the base 20 is deposited upon the relatively cool surface of the plate 12, the heat in the base portion in contact with said plate is rapidly transferred to the same, and, thus, the surface in contact with the plate becomes chilled with respect to the remainder of the base portion. This chilling of the base surface causes the glassware base to crack and become disfigured during the conveying step from the mold to the annealing ovens or lehrs.

To prevent this chilling and resultant cracking, the supporting surface 25 in Figs. 2 and 3 is shown provided with a plurality of raised portions associated with recessed portions. In the present instance these last mentioned portions comprise a plurality of corrugations, the raised portions being indicated by the numerals 26 and the recessed portions by the numerals 27. Hence, the article of glassware when positioned upon a roughened or corrugated plate surface, does not transfer heat as rapidly as has heretofore been the case, since the areas of the surfaces in contact is substantially reduced and the air in the recess of the plates protects the bottom of the bottle from the heat of the conveyer. Furthermore, as shown clearly in Fig. 3 by the dotted line 21, the bottles and the like are provided with a curved bottom exterior which forms an air chamber 28 between said bottle bottom and said plate. This air chamber also serves to insulate the bottom of the bottle from the conveyer.

In Fig. 4 a modified form of the invention is illustrated, and in said figure a plurality of raised projections or points 30 are shown, said points being preferably pyramidal in form. In Fig. 5 another modified form of the invention is illustrated, and in this instance the plate surface 12 is provided with a plurality of raised strip portions 31, said strip portions being arranged in any desired manner, such as diagonally to intersect each other and form diamond shaped recesses 32 and the diamond shaped supporting portions 31.

While the invention has been described in detail, it will be understood that many modifications thereof will suggest themselves to those skilled in the art, two of which have been herein described and illustrated, but all modifications which decrease the surface area in contact to reduce the rapid transfer of heat therewith and prevent the cracking of one of said surfaces are considered to be within the broad purview of this invention.

The invention claimed is:

1. A conveyer for supporting and transporting heated glassware without cracking the same which has a roughened surface to provide air cushioning and air insulation between said surface and the glassware to retain the heat in the latter.

2. An uncovered metallic conveyer for supporting and transporting heated glassware without cracking the same which has a roughened surface to provide air cushioning and air insulation between said surface and the glassware to retain the heat in the latter.

In witness whereof, I have hereunto affixed my signature.

ALEXANDER SAMUELSON.